No. 620,242. Patented Feb. 28, 1899.
F. W. LUSEBRINK.
HANDLE BAR FOR CYCLES.
(Application filed July 28, 1897.)
(No Model.)
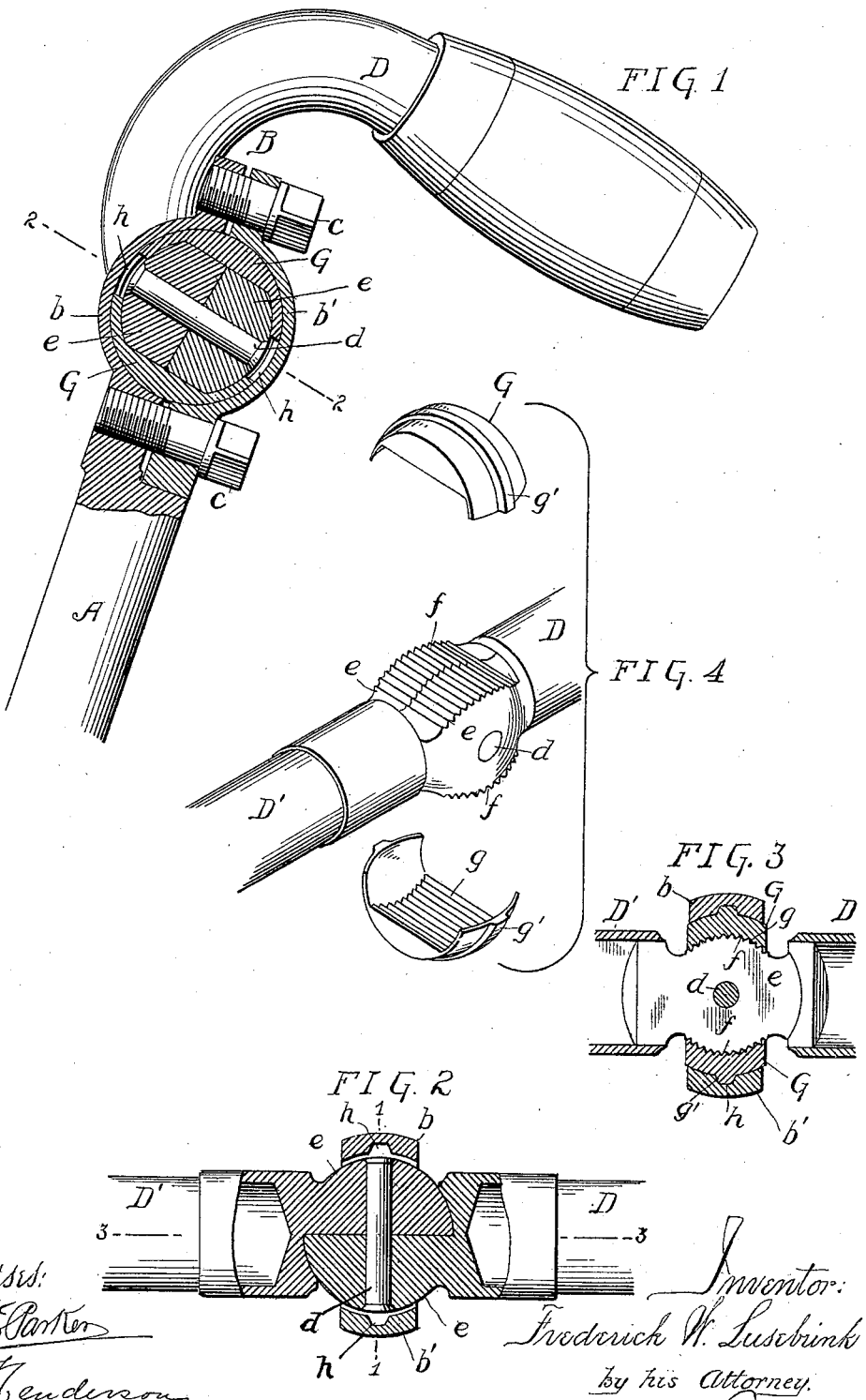

UNITED STATES PATENT OFFICE.

FREDERICK W. LUSEBRINK, OF BRIDGEPORT, CONNECTICUT.

HANDLE-BAR FOR CYCLES.

SPECIFICATION forming part of Letters Patent No. 620,242, dated February 28, 1899.

Application filed July 28, 1897. Serial No. 646,191. (No model.)

*To all whom it may concern:*

Be it known that I, FREDERICK W. LUSEBRINK, a citizen of the United States, and a resident of Bridgeport, Fairfield county, State of Connecticut, have invented certain new and useful Improvements in Adjustable Handle-Bars for Cycles, of which the following is a full, clear, and exact description, reference being had to the accompanying drawings, forming part of this specification.

My invention relates to certain improvements in handle-bars for cycles and similar structures, and has for its object to provide a handle-bar which may be readily adjusted to any desired angle and in which the grips can be adjusted either up or down to suit the convenience of the rider.

In the accompanying drawings, Figure 1 is a sectional elevation on the line 1 1, Fig. 2, of a handle-bar constructed in accordance with my invention. Fig. 2 is a sectional plan view of the same on the line 2 2, Fig. 1. Fig. 3 is a sectional elevation on the line 3 3, Fig. 2; and Fig. 4 is a view representing a perspective, a number of the parts detached.

Referring to the drawings, A represents a portion of the steering-bar, which extends down and is connected to the forks of the front wheel in the usual manner. The head of the steering-bar is in the form of a two-part clamp B, one half of which, $b$, is preferably formed integral with the steering-bar and the opposite half, $b'$, being secured and clamped in position by screws $c$, as shown in Fig. 1.

The handle or grip bars D D' are connected at their meeting ends by a pivot $d$, so arranged that the handle-bars may be freely moved to adjust them in a vertical line. The connecting end of each handle-bar is in the form of a substantially semispherical block $e$, the upper and lower surfaces of which are slightly cut away and are provided with teeth or serrations $f$, as shown more clearly in Figs. 3 and 4. To each of the toothed surfaces $f$ is fitted a removable clamping-block G, having teeth $g$, which correspond to the teeth $f$ and when clamped in position against said teeth act to firmly secure the two handle-bars in any position to which they may be adjusted. The outer surfaces of the block $g$ are curved, and each curved surface is provided with a rib $g'$, adapted to fit into semicircular grooves $h$, formed in the inner faces of the clamps $b\ b'$, and prevent any lateral movement of the handle-bars after the screws $c$ have been tightened.

The handle-bars and the clamping-bars G can be adjusted circumferentially by loosening the screws $c$ and turning the bars and clamping-blocks to such position as may be required to give the handle-bars an upcurve or a drop curve and then tightening the screws and bringing the clamps into frictional contact with the handle-bars and blocks G to an extent sufficient to hold them in proper position.

If desired, the ribs $g'$ and the bottom faces of the grooves $h$ may be serrated or roughened in order to enable them to be clamped more firmly; but this is not found to be necessary in practice.

With a handle-bar constructed in accordance with my invention the grips can be readily adjusted to any desired position and the handles placed either to the front or rear or above or below the head of the steering-bar.

Having thus described my invention, what I claim, and desire to secure by Letters Patent, is—

1. An adjustable handle-bar comprising two bars provided with semispherical meeting ends, a pivot passing transversely through the said ends and a clamp surrounding or partially surrounding the same at the pivot-point, substantially as described.

2. The combination of the two handle-bars, semispherical blocks secured to or formed integral with said handle-bars, a pivot-pin connecting the semispherical blocks, clamping-blocks adapted to be forced into contact with said semispherical blocks, and a clamp embracing said blocks, substantially as specified.

3. The combination of the handle-bars, semispherical blocks, $e$, secured to or formed integral with said handle-bars, teeth or serrations, $f$, provided on said blocks, $e$, a pivot-pin, $d$, extending through the blocks, $e$, toothed blocks, G, adapted to be forced into contact with the teeth, $f$, and a clamp for holding the blocks, $g$, in contact with the blocks, $e$, substantially as specified.

4. The combination of the pivoted handle-bars, blocks adapted to be forced into contact with said handle-bars at their pivot-point, ribs, g', provided on the outer faces of said blocks, and a clamp, B, having an internal groove for the reception of the ribs, g', substantially as specified.

5. The combination of the handle-bars, semispherical blocks, e, secured to or formed integral with said handle-bars, teeth, f, provided on the blocks, e, a pivot-pin, g, connecting said blocks, toothed blocks, G, adapted to be forced into contact with the teeth, f, ribs, g', on the outer faces of the blocks, g, and a clamp, B, having an internal groove, h, for the reception of the ribs, g', substantially as specified.

In testimony whereof I have hereunto set my hand this 14th day of July, A. D. 1897.

FREDERICK W. LUSEBRINK.

Witnesses:
  FREDERICK SCHRADER,
  WALTER W. CASWELL.